United States Patent [19]

Wilkinson et al.

[11] 4,453,182

[45] Jun. 5, 1984

[54] HIGH SPEED IMAGING TELEVISION SYSTEM

[75] Inventors: William O. Wilkinson; David W. Rabenhorst, both of Silver Spring, Md.

[73] Assignee: The Johns Hopkins University, Baltimore, Md.

[21] Appl. No.: 313,245

[22] Filed: Oct. 21, 1981

[51] Int. Cl.³ .............................................. H04N 5/30
[52] U.S. Cl. ..................................... 358/108; 358/93; 358/217
[58] Field of Search ...................... 358/91, 92, 93, 109, 358/209, 211, 217, 225, 206, 208, 113, 108

[56] References Cited

U.S. PATENT DOCUMENTS

| | | | |
|---|---|---|---|
| 2,300,568 | 11/1942 | Hansell | 358/217 |
| 2,359,449 | 10/1944 | Shelby | 358/217 |
| 3,109,057 | 10/1963 | Slavechi | 358/91 |
| 3,419,677 | 12/1968 | Fiori | 358/106 |
| 3,924,937 | 12/1975 | Munroe et al. | 358/206 |
| 4,158,853 | 6/1979 | Sullivan et al. | 358/93 |
| 4,164,753 | 8/1979 | Metcalf | 358/113 |

FOREIGN PATENT DOCUMENTS 565409  8/1977  U.S.S.R. .............................. 358/113

Primary Examiner—Joseph A. Orsino, Jr.
Attorney, Agent, or Firm—Robert E. Archibald; H. Donald Nelson

[57] ABSTRACT

A television system for observing an event which provides a composite video output comprising the serially interlaced images the system is greater than the time resolution of any of the individual cameras.

10 Claims, 3 Drawing Figures

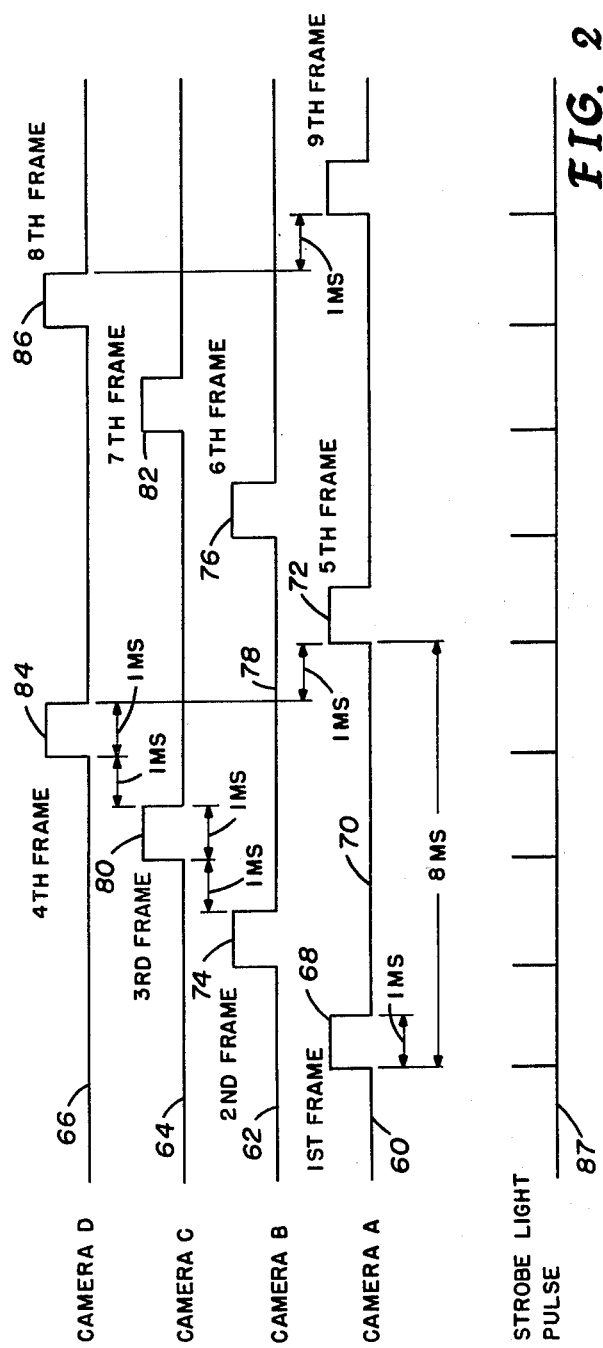
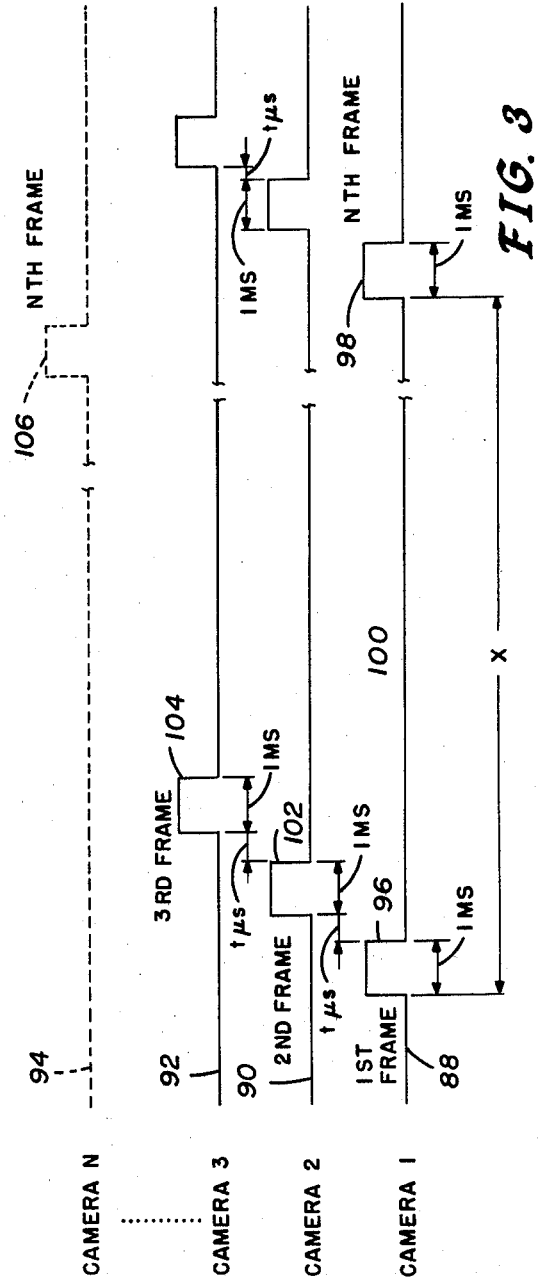

HIGH SPEED IMAGING TELEVISION SYSTEM

STATEMENT OF GOVERNMENTAL INTEREST

The Government has rights in this invention pursuant to Contract #EC-77-C-01-5085 awarded by the U.S. Department of Energy.

BACKGROUND AND/OR ENVIRONMENT OF THE INVENTION

1. Field of the Invention

The present invention relates to the observation of events by video camera techniques, and more particularly to the forming of a composite video signal which comprises the images formed by a plurality of video cameras, the images being interlaced through multiplexing to provide a single video output signal.

2. Description of the Contemporary and Prior Art

There are many instances where it is desirable to closely observe experimental or production phenomena through the use of video imaging techniques. Unfortunately, if such phenomena take place in extremely short time frames, these short time frames may be substantially less than the time necessary for a video camera to form an image. For instance, a standard broadcast video camera does not form an image less than once in every thirty-three milliseconds. If the event to be observed is random and/or occurs in a few milliseconds, there is an excellent chance that such an event will be entirely missed by the video camera.

The particular circumstance which generated the desire for a television system which would provide images faster than the fastest image obtainable by a single video camera was in the testing of superflywheel energy storage apparatuses. These superflywheels have very high energy storage capabilities. The energy storage capabilities, however, are limited by self-destruction caused through imperfections in the material used to fabricate the flywheels and imperfections in assembly. Because much effort is made in determining how assembly can be improved and exactly which material imperfections cause catastrophic failure, it is logically apparent that it is important to observe such failure precisely. Because catastrophic failure is a virtually instantaneous occurrence, observing this extent with a video camera which can only image once every thirty-three milliseconds or so is rather inadequate.

Efforts by others to improve the ability of video systems to observe very short events have been primarily directed toward shortening the length of time it takes a video camera to form an image. Rather than redesigning the video camera, the present invention teaches a method of obtaining a plurality of serial images with virtually no time therebetween, such system being constructed by utilizing presently available video cameras and current technology.

This is accomplished by directing a plurality of video cameras at the same event to be observed, for instance a spinning flywheel, and, sequentially triggering the video cameras to each form an image so that a plurality of images closely spaced together are formed. These images are multiplexed together to provide a single video output which is a composite of the interlaced images of all of the video cameras trained on the event to be observed.

While multiplexing of video signals is well known in the art, multiplexing has not heretofore been utilized to interlace a plurality of outputs of video cameras to form a single interlaced signal output as hereinbefore described.

Typical of prior multiplexed systems is that taught in U.S. Pat. No. 3,492,419 issued to M. Bartonik on Jan. 27, 1970 which discloses the use of several cameras which provide images of the same object or different objects wherein means are provided for switching between the cameras so that the output of one of the cameras can be elected for viewing. Bartonik provides for the transmission of signals from each camera on separate wave frequencies, the composite signal later being received at a location which separates the multiple components of the signal and displays them separately on distinct portions of a television screen. Successive switching between cameras to form a single high speed composite image, as taught by the present invention, is not disclosed nor contemplated since the purpose of the Bartonik apparatus is to permit selection of one of a plurality of images rather than forming a new composite image.

Similarly, U.S. Pat. No. 3,504,133 issued to R. F. White on Mar. 31, 1970 teaches the combining of a plurality of transmitted television signals which can be selectively displayed at a receiver station. These signals are separated at the receiver and are viewed individually.

Many prior art teachings concern signal multiplexing rather than camera multiplexing. For instance, U.S. Pat. No. 3,757,225 issued to E. M. Ulicki on Sept. 4, 1973 shows the multiplexing of a plurality of continuous parallel signals which are sequentially sampled and placed onto a single line. At another location, the multiplex signal can be demultiplexed back into its component signals wherein desired discrete signals can be selectively retrieved. This signal multiplexing is significantly different than successively switching on cameras as taught by the present invention. A similar arrangement as to audio signals is taught by U.S. Pat. No. 3,941,930 issued to K. Mohri et al on Mar. 2, 1976.

U.S. Pat. No. 3,946,155 issued to J. K. Houston et al on Mar. 23, 1976 discloses an optical scanning system wherein a rotating drum has a plurality of radiation detection elements which sequentially pick up an optical signal, the signals from a plurality of detection elements being serially and successively entered onto a single line. Each entered signal, corresponding to a particular element, is then communicated to a cathode ray tube and is displayed as a single raster frame. Signals from successive elements on the drum thus provide successive raster frames. A controlled device is provided which corresponds to the scanning rate resulting from the rotation of the drum with the scanning rate of the cathode ray tube. Gating is provided such that the cathode ray tube frame is scanned each time a pulse denoting the commencement of a scan by a succeeding detection element, or mirror, occurs. That is, each time a new detection element passes before the optical source, a cathode ray tube frame is scanned. The use of this technique in conjunction with a plurality of television cameras to form a composite image is not shown or suggested and this invention is directed toward providing an optical display which is undistorted in shape rather than providing high speed observation of an event through rapid sequentially formed images.

Other teachings in the prior art, such as that in U.S. Pat. No. 3,743,768 issued to G. V. Copland on July 3, 1973, disclose the modification of video frames by interlacing scans within the frame to increase the amount of data carried by a raster at any given time. The present invention, to the contrary, is concerned with providing successive frames from successively out-of-phase cameras and does not deal with the varying of any particular frame generated by any one of the plurality of cameras.

In general, other multiplexing schemes which provide for signal multiplexing are shown in U.S. Pat. Nos. 3,705,263 issued to L. E. Rittenhouse on Dec. 5, 1972 and 3,825,674 issued to J. W. H. Justice on July 23, 1974.

As is apparent from reviewing prior technology, the present invention provides a unique approach to solving the problem of dead-time between the forming of images in a video camera system by the multiplexing of the outputs of a plurality of cameras together to form an interlaced composite video signal which enables high speed viewing of a dynamic event.

SUMMARY OF THE INVENTION

Therefore, a primary object of the present invention is to provide a television system which forms images at a speed greater than that presently possible from a single video camera.

A further object of the present invention is to provide a television system which permits the forming of images virtually one right after the other.

A still further object of the present invention is to provide a television system which is ideally suited for observing extremely rapidly occurring events.

Still another object of the present invention is to provide a television system which permits the observation of a single event by a plurality of cameras along the same path of view.

Still another further object of the present invention is to provide a television system which includes means for illuminating, by stroboscopic means, the event which is to be observed.

Another still further object of the present invention is to provide a television system which can find numerous applications in observation of experimental and production phenomenon.

These objects, as well as further objects and advantages, of the present invention will become readily apparent after reading the ensuing description of a non-limiting illustrative embodiment and viewing the accompanying drawings.

A television system for observing an event, according to the principles of the present invention, comprises: a plurality of video cameras each having an output which provides a plurality of single frame images spaced apart a predetermined time, each of the cameras for observing the event; means for sequentially triggering the forming of the images by each of the cameras such that the images are formed according to a preselected pattern; and means for multiplexing the images together to provide a composite output.

BRIEF DESCRIPTION OF THE DRAWINGS

In order that the present invention may be more fully understood, it will now be described, by way of example, with reference to the accompanying drawings in which:

FIG. 2 is a timing diagram illustrating how four video cameras are controlled in accordance with the present invention; and FIG. 3 is a similar timing diagram for N video cameras.

DESCRIPTION OF THE PREFERRED EMBODIMENT

Figure 1:
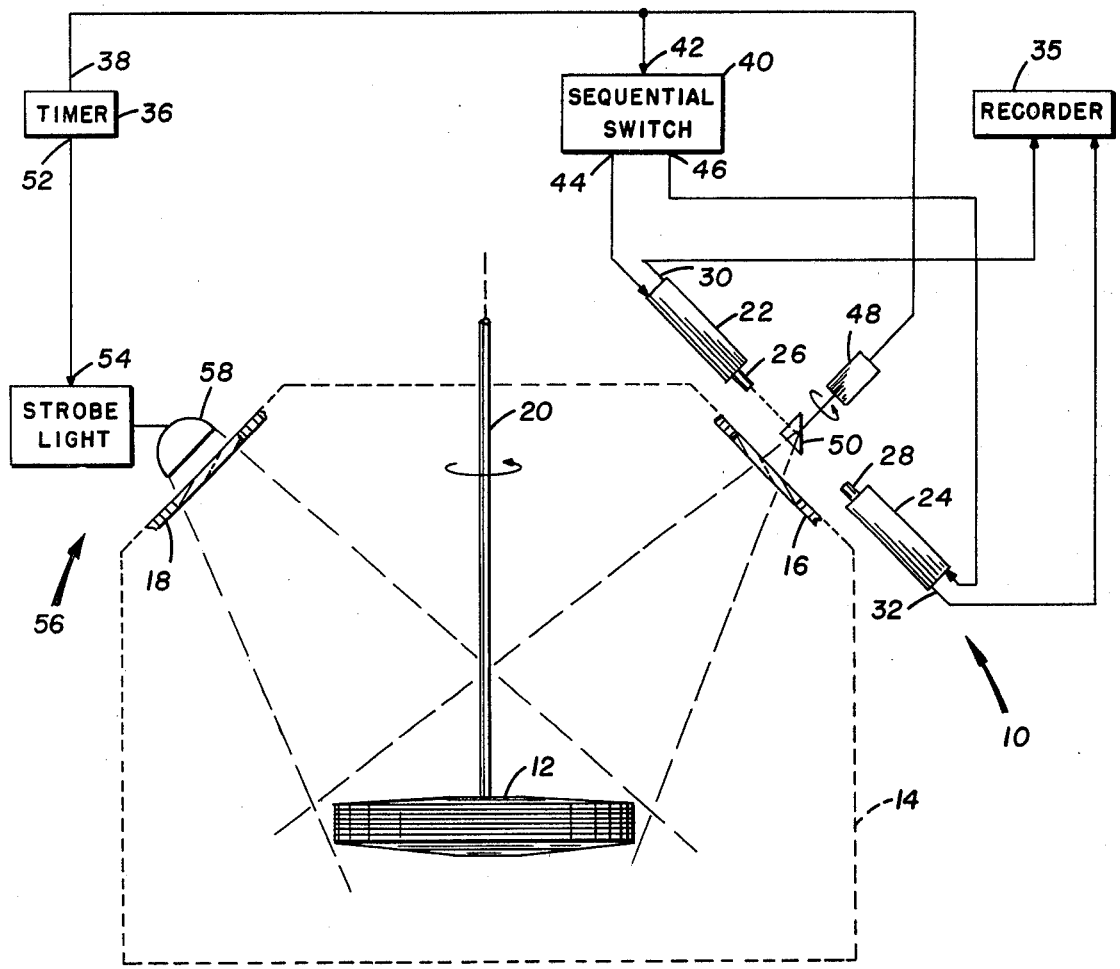
FIG. 1 is a pictorial representation of a high-speed image television system incorporating the principles of the present invention.

Referring now to the figures, and more particularly to FIG. 1, there is illustrated therein a television system 10 constructed in accordance with the principles of the present invention. The television system 10 is employed to observe rotation of a superflywheel energy storage apparatus 12 disposed within a test chamber 14. The test chamber 14 is designed to contain the flywheel 12 upon the catastrophic failure thereof and includes a viewing port 16 and an illumination port 18. The flywheel is mounted on a shaft 20 for rotation and is driven by suitable drive means, not illustrated, the shaft 20 being interfaced through the wall of the test chamber 14 in a suitable manner.

The television system 10 includes a first camera 22 and a second camera 24 each having a lens assembly, 26 and 28. The cameras 22 and 24 can be mounted in any suitable manner and are positioned as hereinafter described. The cameras 22 and 24 are capable of scanning and imaging a single frame, in a time on the order of one millisecond, with successive frames being formed at approximately eight millisecond intervals. As a result, in respect to each camera, there is an effective dead time between frames of approximately seven milliseconds during which the occurrence of any event cannot be observed by an individual camera. A camera tube which operates in this manner is manufactured by RCA and is sold under the Trademark NEWVICON.

The outputs 30 and 32, respectively, of the first camera 22 and second camera 24 are coupled to a recorder 35 which multiplexes (interlaces) and stores, e.g. on videotape, the outputs of the cameras 22 and 24. If storage of the composite signal generated by the outputs of the cameras 22 and 24 is not desired, the individual signals therefrom may be multiplexed and directly viewed on a suitable monitor.

The timing of the activation of the cameras 22 and 24 is controlled by a timer 36 which, at an output 38 thereof, provides a timing pulse input 42 to a sequential switch 40. The sequential switch 40 has a first output 44 and a second output 46 coupled, respectively, to the first camera 22 and the second camera 24. The outputs 44 and 46 of the sequential switch 40 control activation of the first and second cameras 22 and 24 and upon such activation, the object is scanned and an image is formed. The timer 36 and the sequential switch 40 are of conventional design and can be embodied by one of many circuits well known in the art for accomplishing these functions. For instance, the timer 36 may comprise a digital timer and the sequential switch 40 may comprise a stepping relay or a suitable flip-flop circuit.

The output 38 of the timer 36 is also provided to a drive motor 48 which rotatably mounts a prism 50 in the path of view of the lenses 26 and 28, respectively, of cameras 22 and 24. As illustrated in FIG. 1, the drive motor 48 permits the prism 50 to be oriented, upon receipt of an impulse from the timer 36, in a position such that the field of view of the lens assembly 26 includes a view of the flywheel 12 or, when the prism 50 is rotated into the opposite position by the drive motor 48, the field of view of the lens assembly 28 encompasses the flywheel 12. As timing pulses are provided at the output 38 of the timer 36, the drive motor selectively and sequentially permits the first camera 22 and the second camera 24 to alternately view the flywheel 12 along the same path of view. Essentially, the prism 50 can be seen to have a single path of view of the flywheel 12, this path of view alternately being accessible by the first camera 22 or the second camera 24 dependent upon the position of the prism 50.

Although a prism is shown as being interposed between the first and second cameras 22 and 24 and the flywheel 12, it is to be understood that other suitable structure may be employed to accomplish this same function. For instance, it is possible that the cameras themselves could be moved physically into proper position alternately or that a wheel shutter or other optical structure could be employed. The drive motor 48 can be of a digitally controlled type, interfacing with the timer 36 being well within the skill of one of ordinary skill in the art. The timer 36 additionally provides an output 52 which is coupled to an input 54 of a strobe light 56. The illumination head 58 of the strobe light 56 is directed through the illumination port 18 at the flywheel 12 to provide illumination thereof during viewing by the first and second cameras 22 and 24. The strobe light 56 has a flash duration in the microsecond range.

The timer 36 and sequential switch 40 operate such that the cameras 22 and 24 are 180 degrees out of phase and therefore are each activated when the other camera is experiencing its dead time between formation of images. The prism 50 is rotated by the drive motor 48 so that the camera 22 or 24 which is forming an image can view the flywheel 12. As a result of the outputs of cameras 22 and 24 being tied together, a composite video output which is essentially the interlaced frames formed by the cameras 22 and 24 is provided at the recorder 35 for recording. Therefore, the video output of the system 10 simulates that which might be available if a single camera was utilized which had twice the image forming speed capability of either the first or second cameras 22 or 24. To express this mathematically:

let $x =$ the time between the activation of the forming of images by a single camera, and $N =$ the number of video cameras in the system, then $x/N =$ the time between the forming of images at the composite output of the television system 10 provided that the time sequences are equally spaced.

The strobe light 56 is sequentially triggered by the timer 36 such that its illumination can be enjoyed by the camera 22 or 24 which is observing the flywheel 12. To preclude bleed over of the latent light pulses from the strobe light 56, the time between activation of cameras in a system can be delayed a preselected interval.

The timing and triggering relationship between cameras employed in the present invention can be more readily understood with reference to FIG. 2. FIG. 2 graphically illustrates the relationship between sequencing and timing of four cameras employed in a television system incorporating the principles of the present invention as hereinbefore described. The System illustrated includes four cameras A, B, C, and D, the functioning of which are represented, respectively, by time lines 60, 62, 64, and 66. With reference to time line 60, the activation of a single camera A can be observed. An image is formed by camera A in a time of 1 millisecond represented by segment 68 of line 60 and camera A then experiences a seven millisecond dead time represented by segment 70 of line 60 until camera A can form another image represented by line segment 72 of line 60. Each of the cameras A, B, C, and D is sequentially activated with an equal time of one millisecond between such activations.

The activation of a camera B, which occurs after camera A, shown by the time line 62, causes the forming of a frame which is represented by segment 74 of time line 62. The forming of a second image by camera B is represented by segment 76 of line 68 and the dead time between the formation of the images 74 and 76 is represented by a line segment 78 of line 62. As mentioned, the occurrence of line segment 74, which represents the second frame of the composite output of the system 10, is delayed one millisecond from the end of the activation of camera A to prevent light spillover from the strobe light 56 illuminating the flywheel. Similarly, cameras C and D are sequentially activated, the image forming of camera C being represented by segments 80 and 82 of the line 64 and the image forming of camera D being represented by segments 84 and 86 of the line 66. The sequencing of cameras A through D thus continues as previously described in relation to cameras A and B. The reason for equally spacing the forming of images by the individual cameras is to uniformly cover the elapsed time during which a subject is observed. If for some reason nonuniform observation was desired the triggering of the forming of images by the cameras could be varied accordingly. Activation of the strobe light 56 during the aforedescribed video camera sequencing is illustrated by a time line 87, the strobe light activations being indicated as a plurality of vertical lines intersecting line 87.

With reference to FIG. 3, a system having a plurality (N) of cameras sequenced within the teachings of the present invention is shown. Cameras 1, 2, and 3 through to N (where N is the total number of cameras) are represented respectively, by time lines 88, 90, 92 and 94, time lines representing the cameras between camera 3 and camera N being omitted. The first activation of camera 1 is represented by line segment 96, the second activation thereof being represented by line segment 98, the time therebetween being represented by a time X. An image is formed by camera 1 in approximately one millisecond, the time between the forming of images or dead time being represented by a line segment 100. A small interval of a few microseconds (t) after the first image is formed by camera 1, an image is formed by camera 2, represented by line segment 102 of line 90. Then, approximately t microseconds after the forming of the image of camera 2, an image is formed by camera 3, represented by line segment 104 of line 92 and so on until an image is found by camera N, represented by line segment 106 of line 94. Camera 1 then forms its second image which is the Nth +1 frame of the composite video output of the system. The cameras B through N then continue activating in sequence.

The delay t, between the forming of images by successive cameras, is selected to be the minimum time necessary to permit avoidance of the latent tube memory of the video tubes employed and therefore avoids blurring caused by latent light. The time X can be any value dictated by how fast an individual camera can form an image. Of course, the faster time X is, the less total number of cameras will be needed to give the desired result. When a number of cameras are used which would demand strobe light pulses at an interval which exceeds the recycling time of a single strobe, a plurality of strobes multiplexed together can be employed.

Although the present invention has been described in observing certain phenomenon relating to high energy storage superflywheels, it is to be understood that its principles are not limited in any way to observation of such phenomenon but rather are generally applicable to any type of video observation the essential feature being the providing of a composite output which comprises a plurality of interlaced images each formed separately by different video cameras.

It will be understood that various changes in the details, materials, arrangements of parts, and operational conditions which have been herein described and illustrated in order to explain the nature of the invention may be made by those skilled in the art within the principles and scope of the invention.

Having thus set forth the nature of the invention, what is claimed is:

1. An apparatus for providing a continuous recording of a time sequential series of events wherein the time duration of each event is less than the time interval required before a video camera is capable of forming a successive image and for forming a single video output signal of independent time sequential images of the sequential series of events; comprising:
    a number N video cameras;
    means for providing an optical image from the same view point of said time sequential series of events at said N video cameras repeatably through video cameras 1 through N;
    means for sequentially activating each of said N video cameras for providing an independent single frame image of each of said time sequential series of events;
    means for triggering said means for sequentially activating each of said N video cameras repeatably 1 through N according to a preselected timing pattern determined by a time x, where x is said time interval required before a video camera is capable of forming a successive image, a time d, where d is a time permitted for each of said video cameras to form an image and a preselected time t, where t is a time interval between successive images formed by successive video cameras according to a relationship $(d+t)N=x$; and
    means for providing a continuous time sequenced series of independent single frame images forming a continuous video output signal of said time sequenced series of events.

2. An apparatus, as recited in claim 1, further comprising means for lighting said rapidly changing object during said time d.

3. An apparatus, as recited in claim 2, wherein said time t is selected to be short enough to provide an essentially continuous record of said rapidly changing object and wherein said time t is selected to be long enough to minimize light bleed over from said means for lighting said rapidly changing object during a preceding time d.

4. An apparatus, as recited in claim 3, wherein said means for triggering comprises:
    a timing means for demarcating a time series determined by said relationship $(d+t)N=x$; and
    switch means responsive to said timing means for sequentially activating said video cameras.

5. An apparatus, as recited in claim 4, wherein said means for lighting comprises a strobe light directed at said rapidly changing object.

6. An apparatus, as recited in claim 5, further comprising means for triggering said strobe light by said timing means in synchronization with said time d for each of said video cameras.

7. An apparatus, as recited in claim 6, wherein said means for providing an optical image of said rapidly changing object at each of said video cameras comprises:
    a selectively positionable optical system disposed in a path of view of said video cameras; and
    means for selectively positioning said optical system whereby an image of said rapidly changing object is directed to a selected video camera.

8. An apparatus, as recited in claim 7, wherein said means for selectively positioning said optical system is controlled by said timing means whereby said optical system is selectively positioned in synchronization with a selected video camera.

9. An apparatus, as recited in claim 8, further comprising means for recording said continuous video output signal.

10. An apparatus, as recited in claim 9, wherein said selectively positionable optical system comprises a selectively positionable prism and said means for selectively positioning said optical system comprises a motor drive controlled by said timing means.

* * * * *